United States Patent Office 3,061,624
Patented Oct. 30, 1962

3,061,624
HALOALKENYL ESTERS OF DITHIOCARBANILIC ACIDS
George F. Ludvik, Kirkwood, Mo., and John J. D'Amico, Nitro, W. Va., assignors to Monsanto Chemical Company, St. Louis, Mo., a corporation of Delaware
No Drawing. Filed June 9, 1958, Ser. No. 740,526
10 Claims. (Cl. 260—455)

This invention relates to new compounds, to insecticidal compositions and to methods of destroying insect pests. More particularly it relates to haloalkenyl esters of dithiocarbanilic acids, to insecticidal compositions containing them and to methods for their use to destroy insect pests.

The new class of compounds may be represented by the general formula

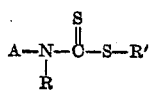

where A represents a phenyl radical substituted or unsubstituted as desired, R represents hydrogen, straight or branched chain alkyl or alkenyl radicals and R' is an haloalkenyl radical. Substituents on the phenyl radical may be alkyl or halogen and the halogen is preferably a middle halogen. Examples of R are methyl, ethyl, propyl, isopropyl, butyl, isobutyl, hexyl, amyl, allyl and butenyl. R' is exemplified by 4-chloro-2-butenyl, 3-bromo-2-butenyl, 3-chloro-2-butenyl, 2-bromoallyl, 2-chloroallyl, 3-iodoallyl, 3-chloroallyl, 2,3-dichloro-2-butenyl, 2-fluoro-3-chloroallyl, 2,3-dichloroallyl, 3,3-dichloroallyl, 2,3-diodo-2-butenyl and 2,3-dichloro-4-bromobutenyl.

Several methods are available for making the new compounds. A procedure which has given good results involves reacting the ammonium salt of the corresponding dithiocarbanilate with an haloalkenyl halide. The following examples illustrate in detail the preparation and properties of some of the compounds but are not to be taken as limitative.

EXAMPLE 1

Approximately 60.6 grams of N-ethylaniline was dissolved in 100 ml. of ethyl alcohol and 50 grams of concentrated ammonium hydroxide. This solution was stirred while to it was added in one portion 50 grams of carbon bisulfide. The reaction mixture was stirred at 25–30° C. for one hour. There was then added 77.7 grams of 2-bromoallyl chloride. The addition caused the temperature to rise from 28 to 45° C. The reaction mixture was then stirred at 25–30° C. for 24 hours and then 400 ml. of water was added. After stirring for 15 minutes the reaction mixture was extracted with 400 ml. of ethyl ether and the ether extract washed with dilute hydrochloric acid until the aqueous layer did not yield any amine upon neutralization with 25% sodium hydroxide. The ether solution was then washed with water until neutral to litmus and dried over sodium sulfate. The ether was removed in vacuo at a maximum temperature of 80–90° C. at 1–2 mm. There was obtained 109 grams (69.1% yield) of 2-bromoallyl N-ethyldithiocarbanilate as an amber oil. It contained 4.1% nitrogen as compared to 4.4% calculated for $C_{12}H_{14}BrNS_2$.

The physical properties of other typical examples prepared in similar manner are summarized below:

*Table 1*

| Example No. | Compound | Physical Appearance | are | Analysis, percent Calcd. | Found |
|---|---|---|---|---|---|
| 2 | 2-Chloroallyl N-methyl-dithiocarbanilate. | solid—M.P. 38–39° C. | N | 5.4 | 5.6 |
|   |   |   | S | 24.9 | 24.9 |
| 3 | 2-Chloroallyl N-ethyl-dithiocarbanilate. | solid—M.P. 40–42° C. | N | 5.2 | 5.1 |
|   |   |   | S | 23.6 | 23.3 |
|   |   |   | Cl | 13.0 | 13.1 |
| 4 | 2-Chloroallyl N-butyl-dithiocarbanilate. | amber oil | N | 4.7 | 4.7 |
| 5 | 2-Chloroallyl N-hexyl-dithiocarbanilate. | ___do___ | N | 4.3 | 4.3 |
| 6 | 2-Chloroallyl N-propyl-dithiocarbanilate. | ___do___ | N | 4.9 | 4.9 |
| 7 | 2-Chloroallyl N-isopropyl-dithiocarbanilate. | ___do___ | N | 4.9 | 4.2 |
| 8 | 2-Chloroallyl N-isobutyl-dithiocarbanilate. | ___do___ | N | 4.7 | 4.3 |
| 9 | 2-Chloroallyl N-ethyl-m-chloro-dithiocarbanilate. | ___do___ | N | 4.6 | 4.0 |
| 10 | 2-Chloroallyl N-allyl-dithiocarbanilate. | ___do___ | N | 4.9 | 4.8 |
| 11 | 3,3-Dichloroallyl N-ethyl-dithiocarbanilate. | ___do___ | N | 4.6 | 4.4 |
| 12 | cis- and trans-2,3-dichloroallyl N-ethyl-dithiocarbanilate. | ___do___ | N | 4.6 | 4.4 |
| 13 | 3-Chloroallyl N-ethyl-dithiocarbanilate. | ___do___ | N | 5.2 | 5.1 |

EXAMPLE 14

To a stirred solution containing 95 grams (0.5 mole) of 3,4-dichloro-N-ethylaniline, 50 grams of concentrated ammonium hydroxide and 100 ml. of ethyl alcohol was added in one portion 50 grams (0.66 mole) of carbon bisulfide. The stirred reaction mixture was held at 25–30° C. for 1½ hours by external cooling and then 55.5 grams (0.5 mole) of 2-chloroallyl chloride was added in one portion. The addition caused the temperature to rise from 25 to 40° C. The reaction mixture was then stirred for 24 hours, 250 ml. of water and 500 ml. of ethyl ether added and stirring continued for another half hour. The ether layer was washed with dilute hydrochloric acid until the aqueous layer did not yield any amine upon neutralization with 25% sodium hydroxide. The ether solution was then washed with water until neutral to litmus and dried over sodium sulfate. The ether was removed in vacuo at a maximum temperature of 80–90° C. at 1–2 mm. The 2-chloroallyl 3,4-dichloro-N-ethyldithiocarbanilate, an amber oil, was obtained in 75.7% yield. Analysis gave 4.1% nitrogen as compared to 4.1% calculated for $C_{12}H_{12}Cl_3NS_2$.

EXAMPLE 15

Substituting 3,3-dichloroallyl chloride for the 2-chloroallyl chloride in Example 14, the temperature rose from 25 to 60° C. in 4 minutes. The 3,3-dichloroallyl-N- ethyl-3,4-dichlorodithiocarbanilate isolated as in Example 14 was an amber oil obtained in 63.5% yield. It analyzed 3.9% nitrogen as compared to 3.7% calculated for $C_{12}H_{11}Cl_4NS_2$.

EXAMPLE 16

To a stirred solution containing 61 grams (0.3 mole) of 3,4-dichloro-N-allylaniline, 30 grams of concentrated ammonium hydroxide and 60 ml. of ethyl alcohol was added in one portion 33 grams (0.396 mole) of carbon bisulfide and the stirred mixture held at 25–30° C. for an hour. Then 33.3 grams (0.3 mole) of 2-chloroallyl chloride was added in one portion, the reaction heated at 50–60° C. for 24 hours and 400 ml. of water added. After cooling to 25° C., the product was extracted with 400 ml. of ethyl ether, the ether solution washed with water until neutral to litmus and dried over sodium sulfate. The ether was removed in vacuo at a maximum temperature of 80–90° C. at 1–2 mm. The 2-chloroallyl N-allyl-3,4-dichlorodithiocarbanilate was obtained as an amber oil in 92.5% yield. Analysis gave 30.0% chlorine as compared to 30.2% calculated for $C_{13}H_{12}Cl_3NS_2$.

EXAMPLE 17

To a stirred solution containing 53.6 grams (0.5 mole) of m-toluidine, 50 grams of concentrated ammonium hydroxide and 100 ml. of ethyl alcohol was added in one portion 50 grams (0.66 mole) of carbon bisulfide and the mixture stirred at 25–30° C. for an hour. Then 55.5 grams (0.5 mole) of 2,3-dichloro-1-propene was added in one portion, the mixture stirred at 25–30° C. for 24 hours and 500 ml. of water added. The dilute solution was extracted with 500 ml. of ethyl ether, the ether solution washed with dilute hydrochloric acid until the aqueous layer did not yield any amine upon neutralization with 25% sodium hydroxide and then with water until neutral to litmus. The ether solution was dried over sodium sulfate and the ether removed in vacuo at 1–2 mm. at 25–30° C. The fraction comprising a viscous liquid was the desired 2-chloroallyl-3-methyl-dithiocarbanilate and analyzed 4.9% nitrogen as compared to 5.4% calculated for $C_{11}H_{12}ClNS_2$.

EXAMPLE 18

To a stirred solution containing 39 grams (0.25 mole) of p-chloro-N-ethylaniline, 50 ml. of ammonium hydroxide and 100 ml. of ethyl alcohol was added in one portion at 25–30° C. 20 grams (0.25 mole) of carbon bisulfide. After stirring for an hour, 27.7 grams (0.25 mole) of 2,3-dichloro-1-propene was added and the mixture stirred at 60–70° C. for 24 hours. After cooling 250 ml. of water was added and the dilute solution extracted with 250 ml. of ethyl ether. The ether solution was washed with water and dried over sodium sulfate. The solvent was removed in vacuo. The 2-chloroallyl p-chloro-N-ethyl-dithiocarbanilate, an amber oil, was obtained in 70.7% yield. Analysis gave 21.8% sulfur as compared to 21.0% sulfur calculated for $C_{12}H_{13}Cl_2NS_2$.

EXAMPLE 19

To a stirred solution containing 53.6 grams (0.5 mole) of N-methylaniline, 80 grams (0.5 mole) of 25% sodium hydroxide and 400 ml. of water was added in one portion 38 grams (0.5 mole) of carbon bisulfide. The reaction mixture was stirred at room temperature for 24 hours, then heated at 60–70° C. for three hours. To this product was added in one portion 72.5 grams (0.5 mole) of cis- and trans-1,2,3-trichloropropene and stirring continued for 24 hours. After isolating as described, the cis- and trans-2,3-dichloroallyl N-methyldithiocarbanilate was obtained in 78% yield as an amber oil. Analysis gave 4.8% nitrogen as compared to 4.8% calculated for $C_{11}H_{11}Cl_2NS_2$.

EXAMPLE 20

To a stirred solution containing 93.2 grams (1.0 mole) of aniline, 70 grams (1.1 moles) of concentrated ammonium hydroxide and 1000 ml. of water was added in one portion 99 grams (1.3 moles) of carbon bisulfide. The reaction mixture was stirred at 25–30° C. for 18 hours and then heated at 40° C. for 10 minutes, filtered and the precipitate washed with water.

To 349.8 grams (0.25 mole) of the 13.35% solution of ammonium dithiocarbanilate thus prepared was added in one portion 29.1 grams (0.2 mole) of cis- and trans-1,2,3-trichloropropene. The addition caused a temperature rise from 28 to 33° C. in 30 minutes. After stirring for 18 hours, the product was extracted with 300 ml. of ether and isolated as described. The cis- and trans-2,3-dichloroallyldithiocarbanilate was a dark amber semi-solid analyzing 5.3% nitrogen and 24.8% chlorine as compared to 5.0% nitrogen and 24.5% chlorine calculated for $C_{10}H_9Cl_2NS_2$.

EXAMPLE 21

To another 349.8 grams portion of the ammonium dithiocarbanilate prepared as in Example 20 was added in one portion 22.2 grams (0.2 mole) of 2-chloroallyl chloride. The temperature rose from 28 to 32° C. in one-half hour. The reaction mixture was stirred for 18 hours and cooled to 5° C. The product was collected by filtration and washed with water until the wash water was neutral to litmus. After drying at room temperature, 2-chloroallyl dithiocarbanilate was obtained as a cream colored solid melting at 78–80° C. Recrystallization from alcohol raised the melting point to 82–83° C. Analysis gave 6.2% nitrogen and 14.0% chlorine as compared to 5.7% nitrogen and 14.5% chlorine calculated for $C_{10}H_{10}ClNS_2$.

The compounds of this invention are excellent insecticides. They may be applied in solution, emulsion, water dispersion or as a dust formulation wherein the active ingredient is mixed with a finely divided solid carrier, as for example talc, clay, pyrophyllite, silica and fuller's earth. Sprays for application to agricultural crops may suitably be applied at concentrations of 0.001 to 1.0%. Employing a concentration of 0.001% of the active ingredient, the products of the examples gave 100% kill of larvae of the yellow fever mosquito. At a concentration of 0.00006% 2-chloroallyl N-allyl-3,4-dichlorodithiocarbanilate gave 90% kill and at a concentration of 0.00003%, a 90% kill was noted with 3-chloroallyl N-ethyl-dithiocarbanilate. The former was toxic to the red flour beetle and even higher kills were obtained with the products of Examples 7 and 14. The product of Example 1 was toxic to the mobile, resting and egg stages of the 2-spotted spider mite. Kills of the plum curculio were observed with the product of Example 21.

It is intended to cover all changes and modifications of the examples of the invention herein chosen for purposes of disclosure which do not constitute departures from the spirit and scope of the invention.

What is claimed is:

1. A compound of the structure

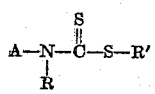

where A is selected from the group consisting of phenyl, metachlorophenyl and 3,4-dichlorophenyl, R is selected from the group consisting of hydrogen, alkyl of 1 to 6 carbon atoms inclusive, allyl and butenyl and R' is selected from the group consisting of haloallyl and halo-2-butenyl wherein the halogen is attached to unsaturated carbon.

2. A compound of the structure

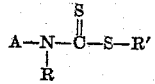

where A is phenyl, R is alkyl of 1 to 6 carbon atoms inclusive and R' is chloroallyl wherein the chlorine is attached to unsaturated carbon.

3. A compound of the structure

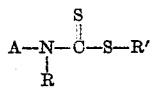

where A is phenyl, R is allyl and R' is chloroallyl wherein the chlorine is attached to unsaturated carbon.

4. A compound of the structure

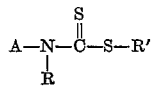

where A is 3,4-dichlorophenyl, R is alkyl of 1 to 6 carbon atoms inclusive and R' is chloroallyl wherein the chlorine is attached to unsaturated carbon.

5. A compound of the structure

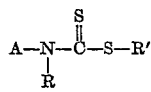

where A is 3,4-dichlorophenyl, R is allyl and R' is chloroallyl wherein the chlorine is attached to unsaturated carbon.

6. 3-chloroallyl N-ethyldithiocarbanilate.
7. 2-chloroallyl N-allyl-3,4-dichlorodithiocarbanilate.
8. 2-bromoallyl N-ethyldithiocarbanilate.
9. 3,3-dichloroallyl N-ethyldithiocarbanilate.
10. 2-chloroallyl 3,4-dichloro-N-ethyldithiocarbanilate.

References Cited in the file of this patent
UNITED STATES PATENTS

| | | |
|---|---|---|
| 2,060,733 | Hunt et al. | Nov. 10, 1936 |
| 2,160,880 | Loane et al. | June 6, 1939 |
| 2,403,495 | Bowen | July 9, 1946 |
| 2,642,451 | Weijlard et al. | June 16, 1953 |
| 2,744,898 | Harman | May 8, 1956 |
| 2,854,374 | Huiseman et al. | Sept. 30, 1958 |
| 2,854,467 | Harman et al. | Sept. 30, 1958 |

OTHER REFERENCES

Harman et al.: J.A.C.S., vol. 75 (1953), pages 4081–4082.

Chabrier et al.: Bull. Soc. Chim. France, 1950, pages D51 and D61.

Childs et al.: J. Chem. Soc., 1948, 2180–3.

Davies et al.: Chem. Abs., 43, 4415 (1949), original reference: Biochem. J., 43, 461–7 (1948).

(Copies of above in Sci. Library.)